(No Model.) 3 Sheets—Sheet 1.
O. M. MORSE.
SEPARATING MACHINE.
No. 514,016. Patented Feb. 6, 1894.
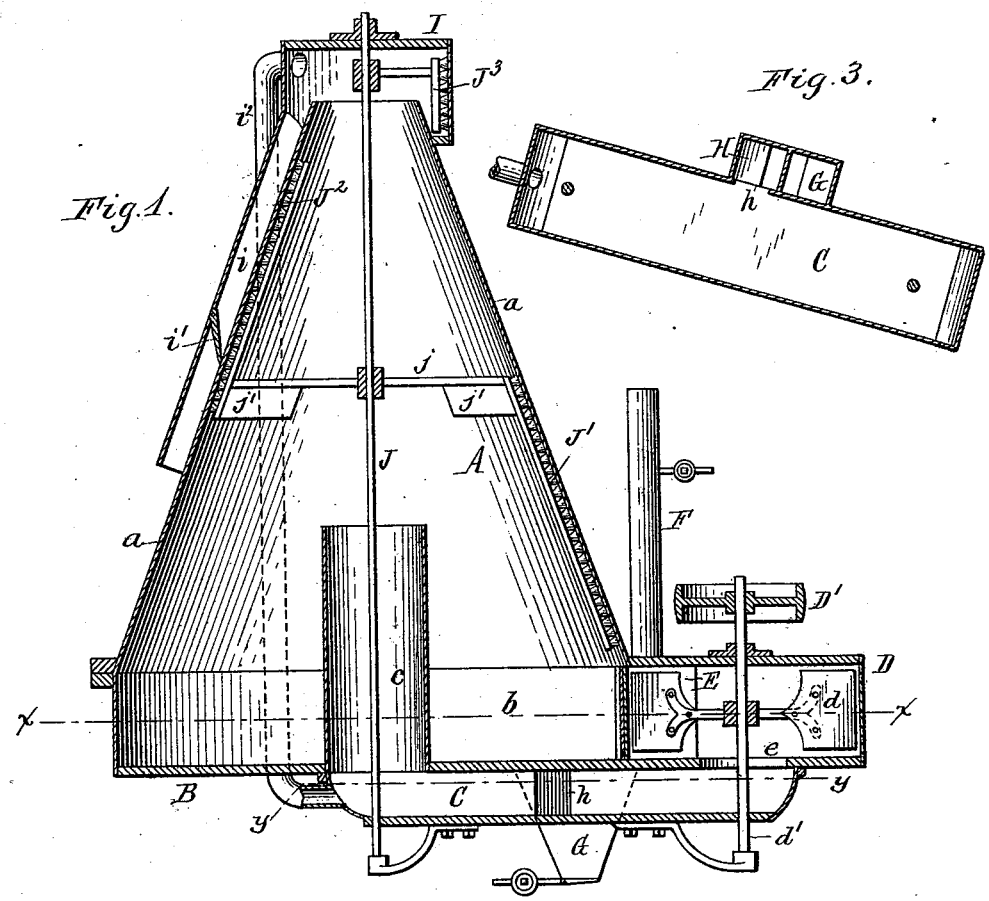
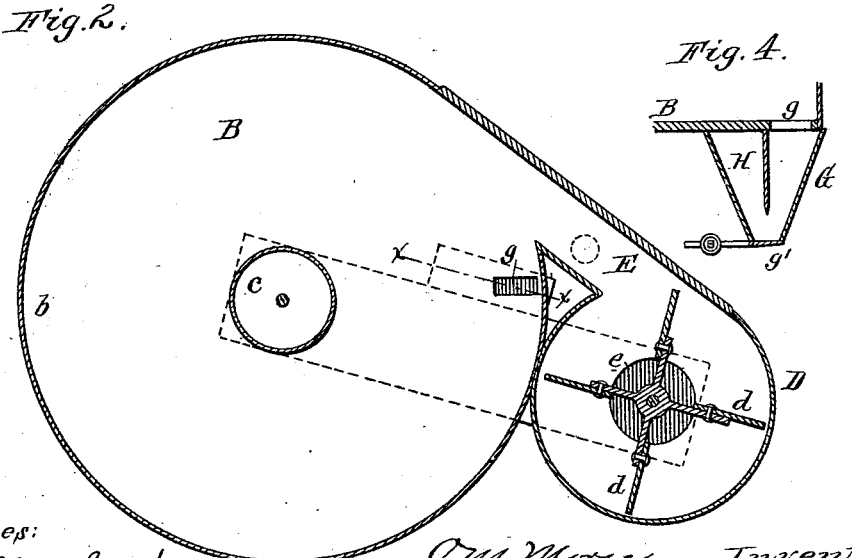

(No Model.) 3 Sheets—Sheet 2.
O. M. MORSE.
SEPARATING MACHINE.
No. 514,016. Patented Feb. 6, 1894.
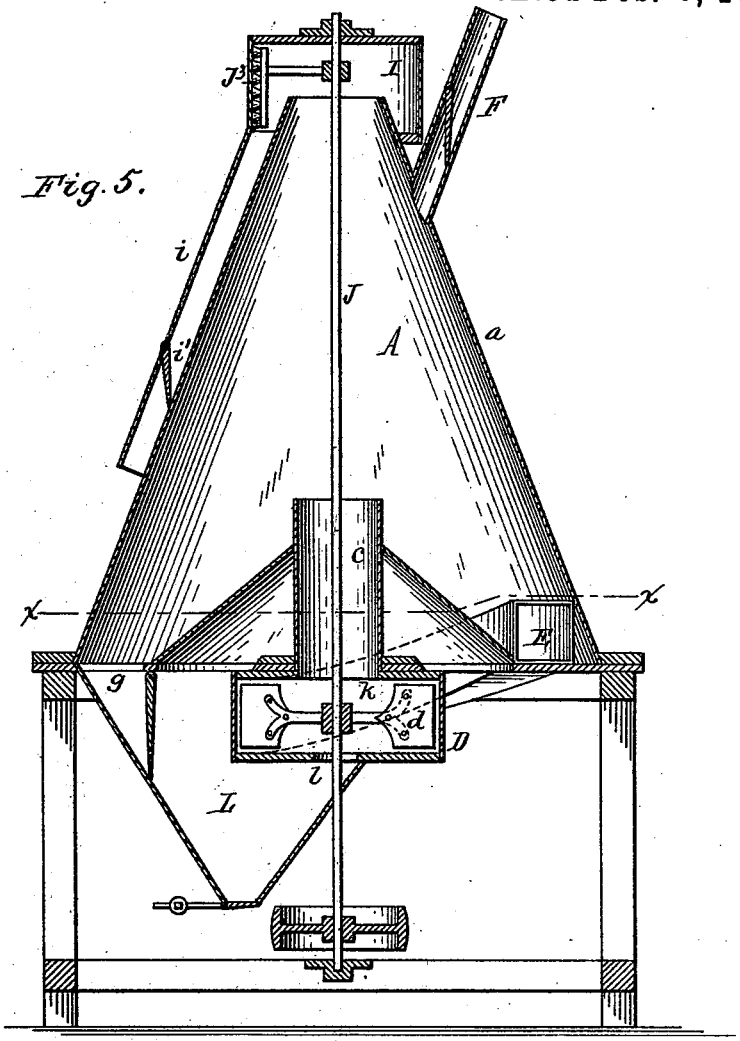
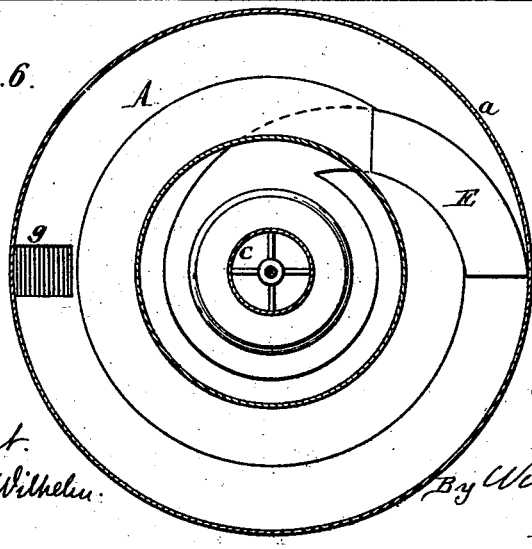
Witnesses:
Emil Neuhart.
Friedrich, Gustav, Wilhelm.
O. M. Morse
Inventor.
By Wilhelm Bonner
Attorneys.

(No Model.) 3 Sheets—Sheet 3.

O. M. MORSE.
SEPARATING MACHINE.

No. 514,016. Patented Feb. 6, 1894.

Witnesses:
Emil Neuhart.
Friedrich Gustav Wilhelm.

O. M. Morse  Inventor.
By Wilhelm & Bonner
Attorneys.

THE NATIONAL LITHOGRAPHING COMPANY,
WASHINGTON, D. C.

UNITED STATES PATENT OFFICE.

ORVILLE M. MORSE, OF JACKSON, MICHIGAN.

SEPARATING-MACHINE.

SPECIFICATION forming part of Letters Patent No. 514,016, dated February 6, 1894.

Application filed April 23, 1891. Serial No. 390,127. (No model.)

*To all whom it may concern:*

Be it known that I, ORVILLE M. MORSE, a citizen of the United States, residing at Jackson, in the county of Jackson and State of Michigan, have invented new and useful Improvements in Separating-Machines, of which the following is a specification.

This invention relates to a separating machine suitable for separating middlings and other substances and which is provided with a separating chamber in which the material to be separated is set in a whirling motion by means of a rotating body of air in which the material is suspended and whereby the component parts of the material are separated according to their gravity.

Figure 7:
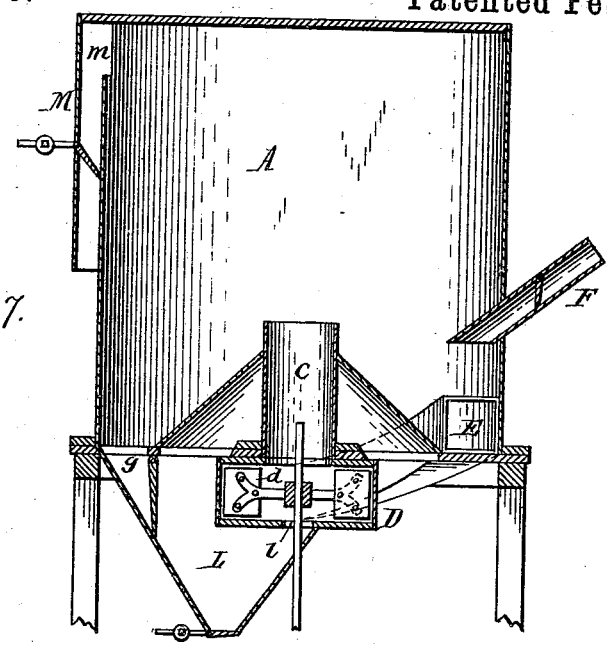
Figure 8:
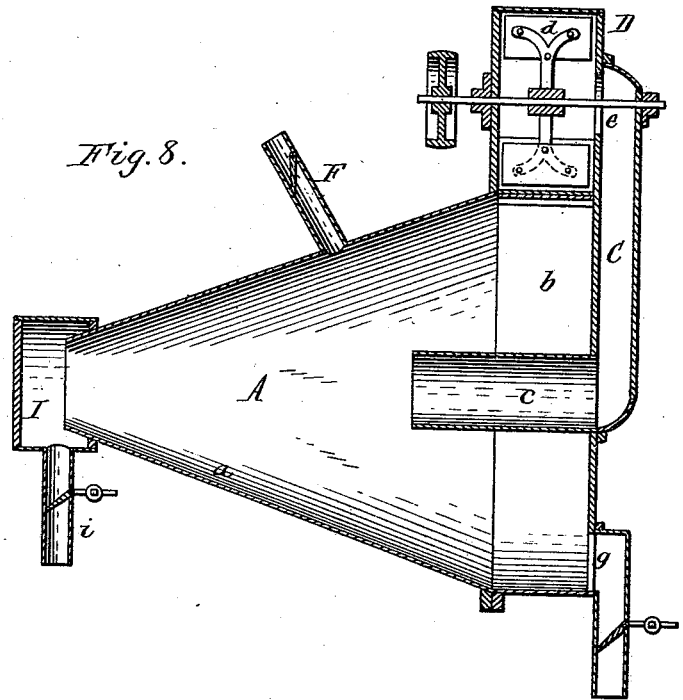

In the accompanying drawings consisting of three sheets:—Figure 1 is a sectional elevation of my improved separating machine. Fig. 2 is a horizontal section through the separating chamber and fan in line $x$—$x$, Fig. 1. Fig. 3 is a horizontal section, through the return spout, in line $y$—$y$, Fig. 1. Fig. 4 is a vertical section, through the discharge spout for the heavy separated material, in line $x$—$x$, Fig. 2. Fig. 5 is a sectional elevation, showing a modified construction of my improved separating machine. Fig. 6 is a horizontal section in line $x$—$x$, Fig. 5. Fig. 7 is a sectional elevation, showing my improved separating machine provided with a cylindrical separating chamber. Fig. 8 is a sectional elevation, showing my improved separating machine with the separating chamber arranged horizontally.

Like letters of reference refer to like parts in the several figures.

A represents the separating chamber composed of an imperforate peripheral wall $a$ which tapers upwardly, and a lower cylindrical portion $b$ having a flat bottom B. The latter is provided with a central air outlet tube $c$ which projects upwardly into the separating chamber and communicates at its lower end with a horizontal return spout C.

D is the fan case arranged on one side of the lower portion of the separating chamber and $d$ are the fan blades arranged in the fan case and secured to a vertical shaft $d'$ which is driven by a pulley $D'$ at its upper end. The return spout C connects with the eye $e$ which is formed in the lower side of the fan case.

E represents the blast spout of the fan which opens tangentially into the lower portion of the separating chamber so as to cause the air and the material suspended therein to whirl or rotate in the separating chamber.

F represents the feed spout through which the material to be separated is introduced into the machine and which is preferably arranged to feed the material into the blast spout of the fan.

$g$ represents the discharge opening for the heavy separated material formed in the bottom B of the separating chamber, and G is the discharge spout which receives this separated material and extends downwardly from the bottom of the separating chamber. The lower end of this spout is preferably provided with an automatic valve $g'$ which permits the material to escape, but prevents ingress of air. The lower portion of this discharge spout is placed in communication with the return spout C by a return passage H which opens into the return spout through an opening $h$ formed in the side of the latter. The upper end of the tapering separating chamber is open and is inclosed by a dust receiving chamber I from which the dust is discharged by a spout $i$ which is provided with an automatic valve $i'$. This dust receiving chamber may be provided with a return pipe $i^2$ by which the air which is driven into the chamber is conducted to the return spout C. When the outlet at the small end of the separating chamber is comparatively large this return pipe may be omitted because the receiving chamber will relieve itself of an excess of air through the central portion of the opening at the small end of the separating chamber.

J represents a shaft arranged axially in the separating chamber and provided with sweeps, wipers or brushes J' J² which bear against the inner side of the separating chamber and remove any material which may adhere thereto. These wipers are secured to radial arms $j$ which are secured to the shaft and which carry vanes or blades $j'$ by which the shaft and the wipers are rotated. A similar wiper J³ is arranged to sweep the inner side of the dust receiving chamber I.

The middlings or other material to be separated are fed into the air current which is propelled by the fan through the blast spout or are otherwise introduced into the moving body of air. The air whirling in the separating chamber drives the solid material against the peripheral wall of the same and effects a separation of the light from the heavy material. When middlings are operated upon in the machine the dust, fluff and other light impurities are carried upwardly in the separating chamber by the spiral movement of the air current and are discharged at the upper end of the chamber into the dust receiving chamber from which they escape through its discharge spout. The purified middlings are too heavy to be lifted by the ascending movement of the air and are furthermore driven to the larger end of the separating chamber by centrifugal force and are discharged through the opening $g$ in the bottom, into the discharge spout G. The air which escapes with the purified middlings into this discharge spout is returned by the passage H into the return spout C. The air which reaches the inner or axial portion of the separating chamber is practically free from solid matter and passes through the tube $c$ and return spout C to the fan by which it is again propelled into the peripheral portion of the separating chamber, so that a continuous circulation of air is maintained within the machine.

In the construction of the machine represented in Figs. 5 and 6, the fan case is arranged underneath the bottom of the separating chamber and the air outlet tube $c$ opens directly into the upper eye $k$ of the fan case so that the return spout C is dispensed with. The discharge opening $g$ in the bottom of the separating chamber, through which the heavy material escapes, opens into a hopper L which is ventilated back into the fan case through an eye $l$ formed in the lower side of the fan case. The feed spout F enters the upper portion of the separating chamber.

In the construction of the machine represented in Fig. 7, the peripheral wall of the separating chamber is cylindrical and provided underneath its top with a discharge opening $m$ through which the light material is delivered into a discharge spout M. In this construction the separating action is largely due to the fact that the heavier material resists the lifting action of the air current which moves upwardly through the separating chamber in spiral lines along the peripheral wall thereof.

In the construction of the machine represented in Fig. 8, the tapering separating chamber is arranged horizontally, in which case the separating action is largely due to the fact that the heavier material is driven by centrifugal force to the large end of the separating chamber, while the light dust is swept by the spirally moving air current to the small end of the chamber.

I claim as my invention—

1. In a separating machine, the combination with the separating chamber having outlets for the heavy and light separated materials at opposite ends and a central air outlet, of a fan having its eye connected by a return spout with the air outlet of the separating chamber and delivering the blast into the separating chamber to cause a whirling motion of the air therein, and a feeder which delivers the material to be separated into the air current, substantially as set forth.

2. The combination with the separating chamber having outlets for the separated heavy and light materials, of an air outlet tube arranged centrally within the separating chamber, a fan and fan case, a return spout connecting the air outlet tube with the eye of the fan case, a blast spout connecting the fan with the separating chamber, a feeder whereby the material to be separated is introduced into the air current, a discharge spout for the heavy separated material, and a return passage connecting said discharge spout with the eye of the fan case, substantially as set forth.

3. The combination with the separating chamber having an outlet and a receiving chamber for the light separated material, an outlet for the heavy separated material, and a central air outlet tube, of a fan case, a return spout connecting the air outlet tube with the eye of the fan case, a return pipe connecting the receiving chamber for the light material with the return spout, a blast pipe connecting the fan case with the separating chamber, and a feeder whereby the material to be separated is introduced into the air current, substantially as set forth.

Witness my hand this 7th day of April, 1891.

ORVILLE M. MORSE.

Witnesses:
C. A. MUNDY,
JNO. G. MUNDY.